US011807192B2

(12) United States Patent
Sikes

(10) Patent No.: US 11,807,192 B2
(45) Date of Patent: Nov. 7, 2023

(54) VEHICLE ACCESSORY MOUNT AND RETAINING SYSTEM

(71) Applicant: Expedition Essentials LLC, Ferndale, WA (US)

(72) Inventor: Jeffrey David Sikes, Ferndale, WA (US)

(73) Assignee: Expedition Essentials LLC, Ferndale, WA (US)

( * ) Notice: Subject to any disclaimer, the term of this patent is extended or adjusted under 35 U.S.C. 154(b) by 228 days.

(21) Appl. No.: 17/391,980

(22) Filed: Aug. 2, 2021

(65) Prior Publication Data
US 2022/0048437 A1 Feb. 17, 2022

Related U.S. Application Data

(60) Provisional application No. 63/064,040, filed on Aug. 11, 2020.

(51) Int. Cl.
*B60R 9/00* (2006.01)
*B60R 9/04* (2006.01)

(52) U.S. Cl.
CPC . *B60R 9/00* (2013.01); *B60R 9/04* (2013.01)

(58) Field of Classification Search
CPC .................................... B60R 9/00; B60R 9/04
USPC ....................................................... 224/555
See application file for complete search history.

(56) References Cited

U.S. PATENT DOCUMENTS

| 2,171,053 | A | * | 8/1939 | White | B60R 9/12 248/205.8 |
| 2,772,824 | A | * | 12/1956 | Binding | B60R 9/12 224/323 |
| 3,719,297 | A | * | 3/1973 | Nowicki | B60R 9/12 224/310 |
| 3,848,785 | A | * | 11/1974 | Bott | B60R 9/12 224/323 |
| 3,999,409 | A | * | 12/1976 | Bell | A63C 11/006 70/58 |
| 4,225,069 | A | * | 9/1980 | Breitschwerdt | B60R 9/055 312/294 |
| 4,261,496 | A | * | 4/1981 | Mareydt | B60R 9/12 224/315 |
| 4,696,449 | A | * | 9/1987 | Woo | E05B 73/0082 211/8 |
| 4,817,838 | A | * | 4/1989 | Kamaya | B60R 9/045 224/323 |

(Continued)

*Primary Examiner* — Nathan J Newhouse
*Assistant Examiner* — Lester L Vanterpool
(74) *Attorney, Agent, or Firm* — Apex Juris, pllc; Tracy M Heims

(57) ABSTRACT

A carrier for releasable retaining a vehicle recovery board or similar cargo including a base plate proportioned, a pivot mount member with a crossbar wherefrom a pivotally connected, activating retainment arm with a fastener end is perpendicularly disposed and a stationary mount member with a receiving latch member. Downwardly disposed planar bottoms of pivot leg(s) and fixed leg(s) proximate to a respective one or another of the pair of opposed side edges of the base plate respectively affix pivot and stationary mount members in substantially longitudinal parallel alignment such that coupled engagement of a fastener end of the retainment arm and a receiving latch member on the stationary mount member securely retains the vehicle recovery board or other cargo on the carrier.

17 Claims, 7 Drawing Sheets

(56) References Cited

U.S. PATENT DOCUMENTS

| | | | | |
|---|---|---|---|---|
| 4,867,362 | A | * | 9/1989 | Finnegan .................. B60R 9/12 |
| | | | | 280/727 |
| 4,930,671 | A | * | 6/1990 | Tittel ....................... B60R 9/12 |
| | | | | 224/329 |
| 4,940,175 | A | * | 7/1990 | Tittel ....................... B60R 9/12 |
| | | | | 224/321 |
| 5,054,673 | A | * | 10/1991 | Dixon ...................... B60R 9/12 |
| | | | | 224/325 |
| 5,115,955 | A | * | 5/1992 | Dallaire ................... B60R 9/12 |
| | | | | 224/322 |
| 5,119,980 | A | * | 6/1992 | Grim ........................ B60R 9/12 |
| | | | | 292/85 |
| 5,137,195 | A | * | 8/1992 | Walter .................... B60R 9/058 |
| | | | | 224/322 |
| 5,456,397 | A | * | 10/1995 | Pedrini .................... B60R 9/12 |
| | | | | 224/316 |
| 5,490,621 | A | * | 2/1996 | Dixon ...................... B60R 9/12 |
| | | | | 248/316.1 |
| 5,560,138 | A | * | 10/1996 | Dentsbier .............. A01K 97/10 |
| | | | | 43/21.2 |
| 5,657,913 | A | * | 8/1997 | Cucheran ................. B60R 9/12 |
| | | | | 224/558 |
| 5,675,999 | A | * | 10/1997 | Carlstrom ........... A63C 11/006 |
| | | | | 70/58 |
| D394,240 | S | * | 5/1998 | Cucheran .................... D12/412 |
| 6,397,644 | B1 | * | 6/2002 | Gidding ............... B60R 9/0485 |
| | | | | 224/310 |
| 7,108,163 | B1 | * | 9/2006 | Pedrini .................... B60R 9/12 |
| | | | | 224/323 |
| D642,113 | S | * | 7/2011 | Farber ........................ D12/414 |
| 9,334,689 | B2 | * | 5/2016 | Sautter, Jr. ............. B60N 3/103 |
| 9,649,988 | B2 | * | 5/2017 | Magnusson ............ A63C 11/02 |
| 9,987,997 | B2 | * | 6/2018 | Rarey ..................... B60R 9/048 |

* cited by examiner

VEHICLE ACCESSORY MOUNT AND RETAINING SYSTEM

CROSS-REFERENCE TO RELATED APPLICATION

This application claims priority to and incorporates by reference the disclosure of U.S. Provisional Patent Application Ser. No. 63/064,040, filed Aug. 11, 2020.

FIELD OF THE INVENTION

This invention relates to the field of vehicle storage systems, and in particular to surface mount retainers adaptable to a traction mat or recovery board.

BACKGROUND OF THE INVENTION

There exist numerous carrier or securing devices and mechanisms for mounting and retaining vehicle accessories, including traction mats and pads, also known as recovery boards, configured for mobilizing one or more wheels that are stuck in mud, snow, sand or any type of loose terrain along a path trajectory and thereby mobilize a vehicle, typically off-road, all-terrain vehicles such as utility vehicles and trucks, but can also be used for automobiles and other wheeled vehicles.

Recovery boards for providing traction to mobilize stuck vehicles were typically stored within or on vehicle exteriors, interiors and trunk spaces. As used herein, "recovery board" refers to any traction surface or platform configured for providing an interface to generate motion along the tangential vector whereby torque drives a vehicle wheel. To avoid sliding and disheveling and facilitate stable and accessible storage, known systems have employed conventional fasteners, including locking pins inserted through corresponding apertures detachably securing such traction platforms to vehicle surfaces. Such systems entail use of loose and often diminutive components and awkward fastening mechanisms rendering them cumbersome. The loose components are easily misplaced or lost, and may waste time to track, find or replace. The inconvenience and confusion is particularly challenging and may even result in danger when a vehicle is stuck in untoward or precarious weather or terrain conditions.

Conventional vehicle recovery board storage and transportation structures are typically semi-permanently, but can be permanently, mounted on the surface of a vehicle or accessory attached to a vehicle and include securing mechanisms typically dedicated to a particular manufacturer's model or size and type of traction pad adapted to a particular wheel shape or terrain surface. These prior art systems typically deploy fixed lines or frames, which cannot be lengthened or positioned askew from precise aligning of pin or bolt and corresponding aperture pairing required to retain the traction mat, and are often molded or otherwise rigidly conformed to dedicated products. Hence, they are not configurable to differing lengths or angles in order to adapt to various sizes and shapes of products/drawbacks of such conventional designs thus include lack of adaptability to differing recovery board platforms.

One such conventional traction mat retainer system is the commercially available Maxtrax® system. Maxtrax® mats are retained by locking pins and corresponding hole mounts in opposed that are secured by locked engagement of the protruding end of the pin to secure the mat onto the rooftop carrier surface. Due to the fixed spacing and commensurate dimensions for fitted mounting of the corresponding corner apertures on the Maxtrax® recovery pad, such prior art locking pin mechanisms are delimited to dedicated traction mats.

In addition, conventional vehicle mounting and storage mechanisms such as Maxtrax® locking pins are cumbersome, inconvenient and tedious. Aligning the mount holes to insert pins and engaging/disengaging the pin tops entails access and a line of vision which are often impeded, particularly when access to the relevant vehicle surface may be blocked or difficult to scale. For example, commonly employed rooftop mounts require climbing up onto a vehicle in order to guide the holes into simultaneous threaded alignment therewith and then separately latching the four individual pins into respective secured positions.

The often cumbersome and inconvenient access to a vehicle surface which is typically located in a low interference stowage area is particularly problematic during harsh conditions or inclement weather when extreme cold, heat, wind or storms may impede a user's dexterity, vision or ability to maneuver in order to grasp and release or replace a locking pin or similarly tight-fitting, unwieldy mechanism.

In sum, nothing in the prior art that provides ready, convenient, versatile and facile system for mounting and storage of traction pads and mats and related cargo subvert ready, convenient and facile access. Thus, there persists a need for a vehicle recovery board mounting and retainer system which overcomes such and other limitations, problems and drawbacks.

SUMMARY OF THE INVENTION

The present invention provides a versatile and portable carrier for releasable retaining of a vehicle recovery board or other suitable cargo. Embodiments of this carrier includes a base plate proportioned to provide a support layer under the vehicle recovery board equipped with a pivot mount member with a hinged mount and a stationary mount member with a fixed mount affixed in spaced substantially parallel alignment for receiving the vehicle recovery board. The pivot mount member is affixed proximate to one of the pair of opposed side edges of the base plate and includes an active hinge pivotable along an axial trajectory attached to an activating retainment arm configured for fitted correspondence with an upper portion of the vehicle recovery board. The pivotally connected retainment arm has a fastener end whereby coupled engagement of the fastener end with the receiving latch member of the stationary mount member securely retains the vehicle recovery board on the base plate.

According to some embodiments of the present invention, the pivot mount member and stationary mount member may further include crossbars with one or more legs with downwardly disposed bottoms attached to a portion of the base plate proximally to corresponding opposed side edges. In some embodiments, the pivot mount member has a pivot crossbar with opposed ends wherefrom pivot legs are disposed and their planar bottoms are attached to proximally to one of the base plate side edges on corresponding portions of the base plate. On the opposed side edge of the base plate, the stationary mount member has a fixed crossbar with downwardly disposed fixed legs on opposed ends and have planar bottoms in substantial longitudinal alignment such that the pivot mount member and the stationary mount member are in substantially parallel alignment.

Some preferred embodiments may further feature flanged stays disposed on an inward facing surface of the respective pivot and fixed legs of the pivot mount member and stationary mount member, wherein the pivot flanged stay and the fixed flanged stay are configured to seat corresponding side portions of the recovery board when secured in a retained position.

Preferred embodiments may yet further feature an activating retainment arm configured for fitted correspondence with an upper portion of the vehicle recovery board or other cargo. Such embodiments may configure and position the retainment arm within cavities between protrusions or elevated portions of the recovery board when the activating retainment arm member is coupled in locked engagement.

The fastener latch of the activating retainment arm may employ a compression triggered locking mechanism, i.e., a compression lock, whereby the pivoting the activating retainment arm member along the predetermined axial trajectory simultaneously grips the vehicle recovery board while the fastener end engages the latch member of the stationary mount member. Release of the compression lock readily disengages the fastener end from the receiving latch member such that the activating retainment arm member actively releases the fastener, enabling upward pivoting of the activating retainment arm to facilitate removal of the vehicle recovery board.

Various embodiments of the present carrier may further include fastening holes configured for receiving a fastener affixing the base plate to a surface on or attached to a vehicle.

A yet further feature of some embodiments include a first pad portion and a second pad portion configured for fitted correspondence with a planar bottom surface of the pivot leg of the hinged mount and with a planar bottom surface of the fixed leg of the stationary mount member wherein the pad portion interfaces corresponding portions of the base plate and the respective planar bottom surfaces of the respective pivot leg feet portion and fixed leg feet portion upon coupled engagement of the fastener end with the receiving latch member. The pad portions are designed and made to both absorb any play or movement, particularly in points of contact between the carrier and recovery board or other cargo, and thereby attenuate impact and load pressure to protect the cargo from shifting, rubbing and resulting noise and damage.

Various embodiments may also feature a pad interfacing the bottom surface of the base plate wherein the pad portion is affixed between the base plate the bottom surface of the vehicle recovery board upon coupled engagement of the locking end with the latch member.

In alternative embodiments of the present invention, activating retainment arm may be sized to telescope tubular sections sized to adjust the extension to sizes commensurate to the sizes and shapes of the recovery board, as well as, other vehicle accessory and equipment or carrier retained therein.

Some embodiments have a first through hole integrally affixed proximate to the fastener end of the activating retainment arm and a corresponding second through hole in the receiving portion of the stationary mount member. The first and second through holes are padlock mount holes respectively spaced so they are aligned when the activating retainment arm member is secured, whereby a padlock shackle can be received through the aligned first through hole and second through hole and latched when the activating retainment arm member is coupled in locked engagement. The padlocked first and second through holes thus further secure the recovery traction board or other cargo in a tightened engaged position.

In alternative embodiments of the present invention, dimensions, configurations and angles of the pad and arms may be modified to adapt to other vehicle accessories including but not limited to recreational gear such as paddle boards, surfboards, snowboards, skis or cargo carriers. The angle is optimally selected to accommodate the size and shape of relevant cargo.

Potential configurations which may be employed to accommodate various vehicle recovery boards and other accessories, equipment and cargo types are too numerous and diverse to individually specify. For example, the dimensions of the base plate and other components may be adapted to contain fewer or more, or variously sized recovery boards. In other embodiments, pivoting arm members may be employed to retain recreational equipment, such as, for example, paddle boards, surf boards, surf boards, snowboards, etc., or can be adapted or adjustable adjusted between a range of or selected positions.

These and other features of the present invention will be evident from the ensuing detailed description of preferred embodiments along with the drawings.

DETAILED DESCRIPTION OF THE ILLUSTRATED EMBODIMENTS

Figure 1:
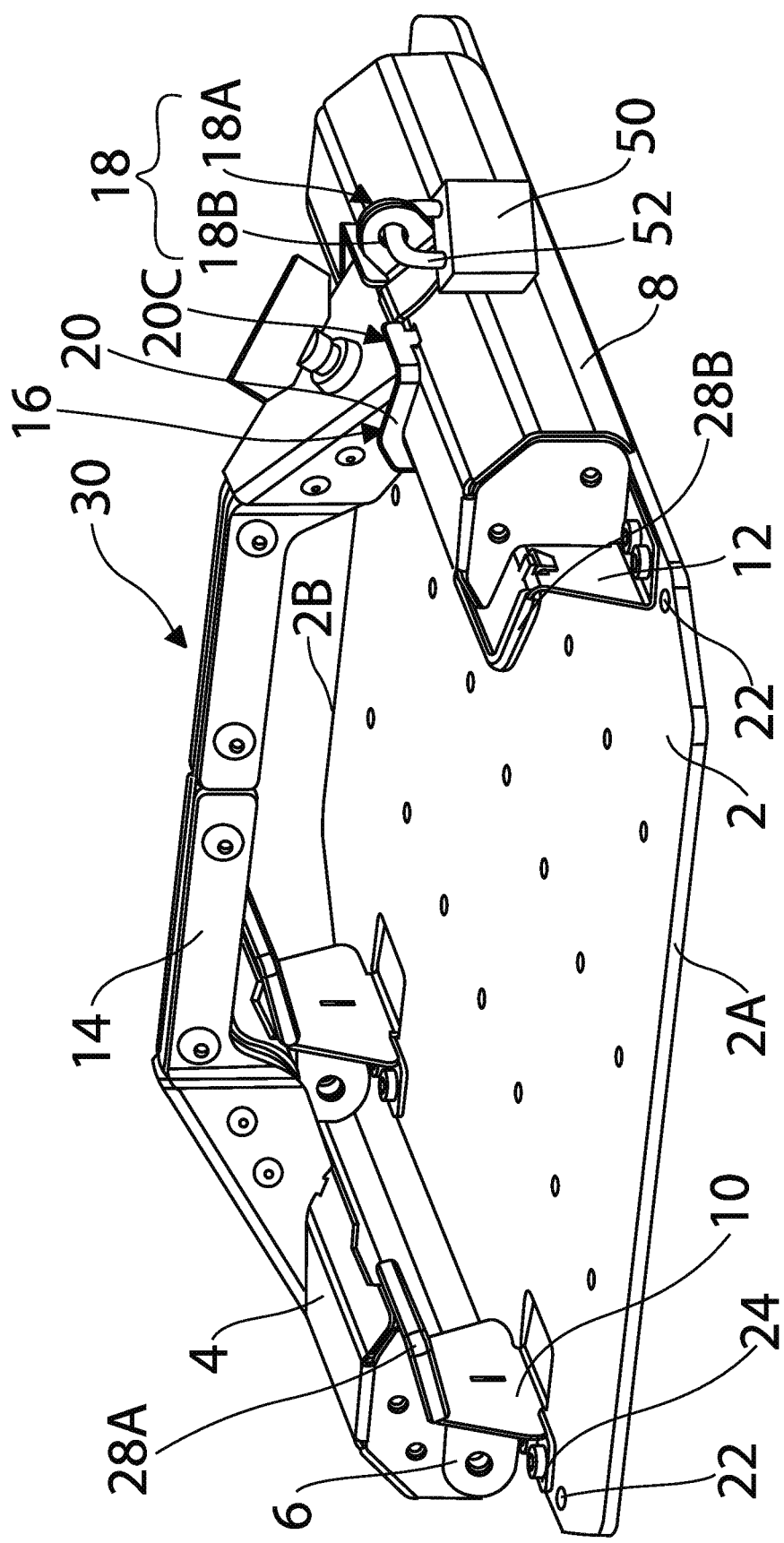
FIG. 1 is a perspective view of the carrier without a retained accessory.

The disclosed subject matter will become better understood through review of the following detailed description in conjunction with the figures. The detailed description and figures provide example embodiments of the invention described herein. Those skilled in the art will understand that the disclosed examples may be varied, modified, and altered without departing from the scope of the invention described herein.

Throughout the following detailed description, representative examples of features of the present cargo attachment assembly and system are disclosed to illustrate aspects of the claimed invention. Related features in the examples may be identical, similar, or dissimilar. The reader should understand that a given feature need not be the same or similar to the specific portrayal. It should therefore be understood that the representative embodiment illustrated in FIGS. 1-7 is adapted to an automobile and specifically a sport utility vehicle. However, it should be understood that the claimed and described features of other embodiments of the claimed invention may be adaptable to other applications, including, for example, trailers, storage containers and units, or any other storage and organizational articles, in addition, the carrier can further be used for direct or indirect attachment of various articles such as, for example, ropes, slings, other vehicle recovery gear, flashlights, climbing, fishing or camping gear, weapons, tools and containers.

Now referring to FIGS. 1-6, the illustrated carrier 30 for releasable mounting of a vehicle recovery board 40 includes a base plate 2 extending between a pair of opposed side edges 2A, 2B. As shown, base plate 2 is substantially parallelogram-shaped configured for fitted correspondence with vehicle recovery board 40. Although dimensions of alternative embodiments may vary widely to accommodate the particular use, the illustrated base plate 2 measures about 19 inches (48 cm) long and about 15 inches wide (38 cm).

Still referring to FIGS. 1-6, carrier 30 includes pivot mount member 4 adjoined by hinged mount 6 to base plate 2 proximate to an one of the pair of opposed side edges 2A and a stationary mount member 8 affixed in substantially parallel longitudinal alignment proximate to another of the pair of opposed side edges 2B. Pivot mount member 4 is mounted on a pair of pivot legs 10 extending from opposed ends of a crossbar and affixed proximate to the one of the opposed side edges 2A. Stationary mount member 8 is mounted on a pair of fixed legs 12 extending from opposed ends of a crossbar and affixed in parallel alignment to pivot mount member 4 proximate to the another of the opposed side edges 2B.

Extending from a midportion of pivot mount member 4 crossbar is an activating retainment arm 14 configured to extend across a width of the vehicle recovery board 40. On a midportion of stationary mount member 8 is receiving latch member 16. As further depicted in the FIGS. 1, 4-5 and 6, activating retainment arm 14 is configured for grasping a top portion of the recovery board 40 such that the activating retainment arm 14 maintains firm downward pressure on recovery board 40 when fastener end 16 and latch member 20 are engaged by a compression triggered locking mechanism 20C thereby securing carrier 3045 in a locked position.

Again referring to FIGS. 1-6, stationary mount member 8 also includes fixed legs 12 and a second stationary mount member. Pivot mount member 4 and stationary mount member 8 are configured so that simultaneous coupled engagement of the fastener end 16 locks into receiving latch of the stationary mount member 8 to thereby secure respective retainment arm 14 in a width direction across the vehicle recovery board securely retains the vehicle recovery board 40 on base plate 2.

In the illustrated embodiment, coupled engagement of fastener end 16 with receiving latch member 20 is activated and deactivated by a compression triggered locking mechanism. Now referring to FIG. 6, carrier 30 may be further provided with first pad portion and a second pad portion 24 configured for fitted correspondence with a planar bottom surface of the first pivot mount member 4 and stationary mount member 8 respectively. Pad portions 24 are juxtapositioned between a corresponding portion of the base plate 2 and the respective planar bottom surface of pivot leg 10 of hinged mount 6 and between a corresponding portion of the base plate 2 and the planar bottom surface of fixed leg 12 of stationary mount member 8.

The illustrated embodiment may further include pad configured for fitted correspondence with the base plate 2 wherein the pad is affixed between the base plate 2 and the recovery board 40 upon coupled engagement of the fastener end 16 with the receiving latch member 20 to thereby protect recovery board 40 from impact and shifting on the base plate 2.

Still referring to FIGS. 1-6, on an end of retainer bar 14 proximate to fastener end 16 is a first through hole 18B and receiving portion of the stationary mount member 8 has a corresponding second through hole 18A configured for aligned correspondence with first through hole 18B whereby padlock 50 may be mounted by insertion of padlock shackle 52 through aligned first through hole 18B and second through hole 18A when the fastener end 16 is coupled in releasable locked engagement with receiving latch member 20 to further secure the recovery board 40.

In some embodiments of the present invention, attached along opposing side edges 2A, 2B of base plate 2 are pivot mount member 4 and stationary mount member 8 having transverse crossbars with respectively attached to upper portions of pivot leg 10 and fixed leg 12. The bottom surfaces of pivot leg 10 and fixed leg 12 are planar to facilitate attachment to base plate 2 and may be interfaced therebetween with pad portion 24.

Pivot hinge 6 connects pivot leg 10 and pivot mount member 4 to thereby enable activating retainment arm 14 to grasp a top portion of recovery board 40 when activating retainment arm 14 is pivoted downwardly in an axial direction toward stationary mount member 8 so as to activate compression triggered locking mechanism 20C when fastener end 16 is engaged with receiving latch member 20.

Still referring to FIGS. 1-6, pivot mount member 4 has pivot leg 10 connected to base plate 2. The stationary mount member 8 has stationary leg 12 perpendicularly disposed from opposed ends. Stationary mount member 8 includes a pair of fixed legs 12 extending in a perpendicular direction proximate to ends of an attached crossbar.

Midpoint on the crossbar of stationary mount member 8 is receiving latch member 20 configured to engage and disengage fastener end 16 of activating retainment arm 14 when pivoted downward to engage receiving latch member 20 that may be a compression triggered locking mechanism 20C, such as shown in FIGS. 1-6.

Pivot legs 10 and stationary legs 12 are further provided with a respective pair of protruding flanged pivot stays 28A and flanged fixed stays 28B configured to seat corresponding sides of the recovery board 40.

Pivot legs 10 and stationary legs 12 may be fastened to the base plate 2 with bolts threaded through corresponding holes 22.

As illustrated in the exemplary embodiment, activating retainment arm 14 is affixed to a midpoint of crossbar of pivot mount member 4 and thereby axially pivotable.

Figure 2:
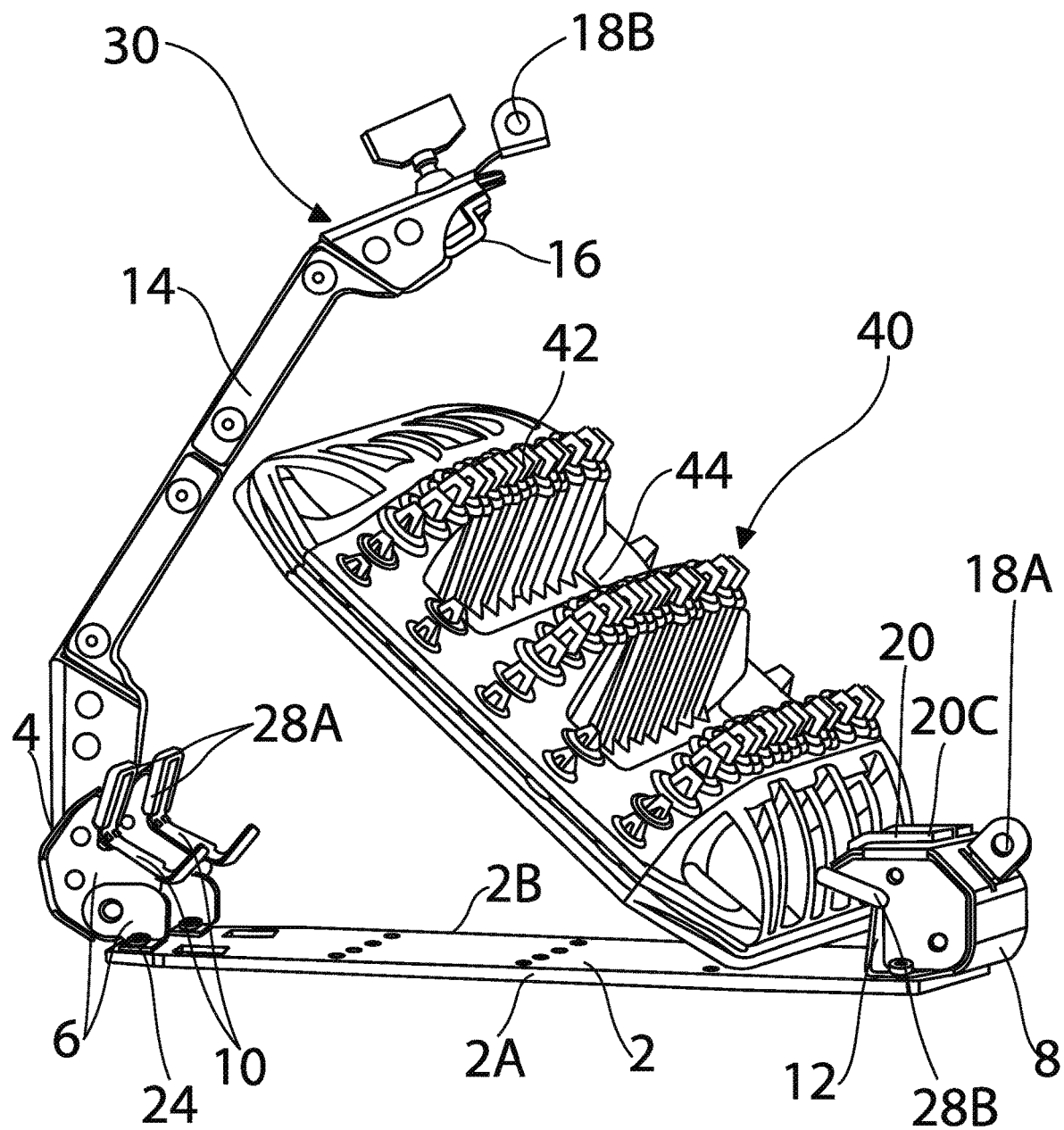
FIG. 2 illustrates the recovery board being mounted in the carrier.
Figure 3:
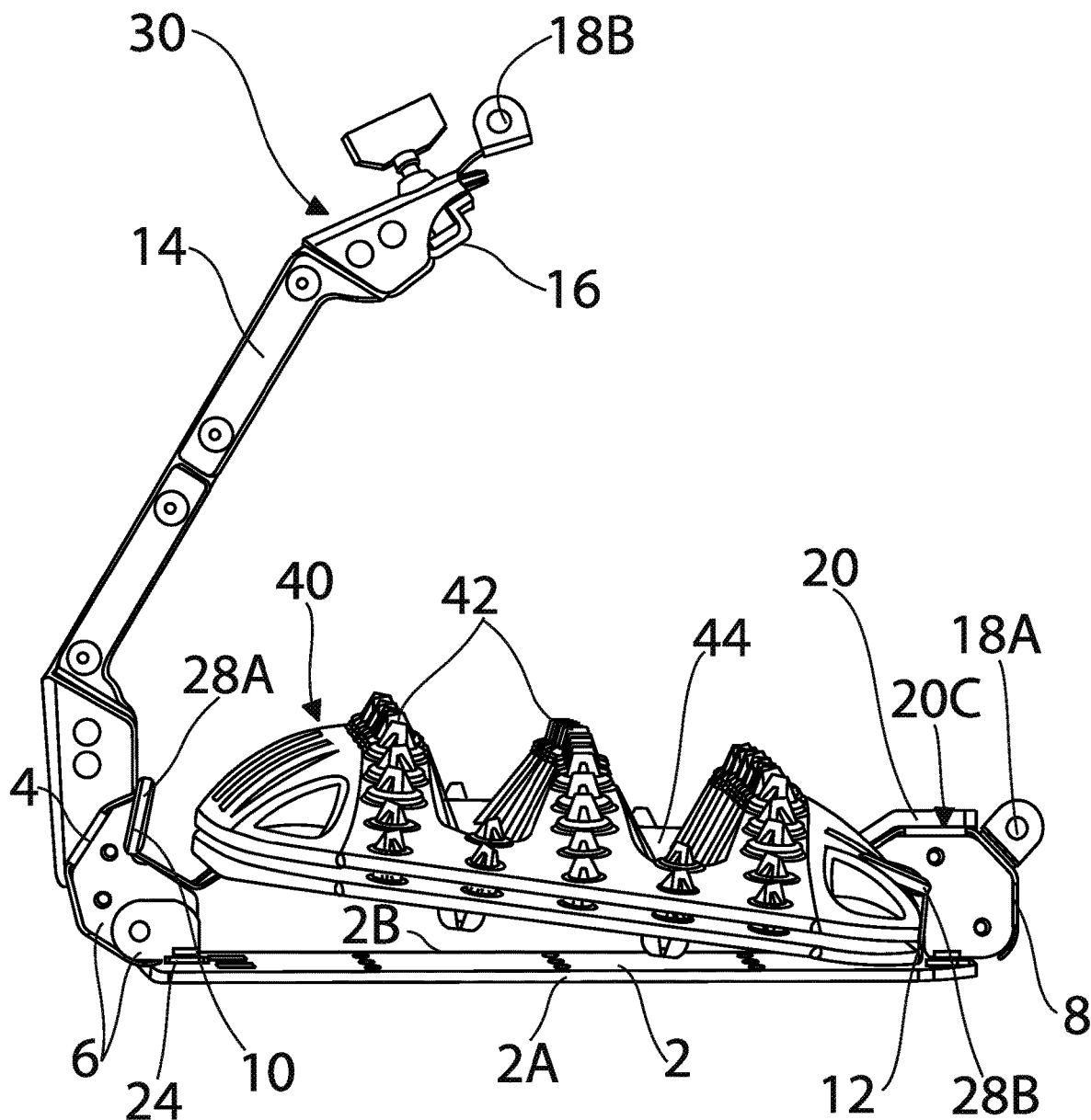
FIG. 3 illustrates the recovery board being positioned between flanged stays of the pivot mount member and the stationary mount member of the carrier.
Figure 4:
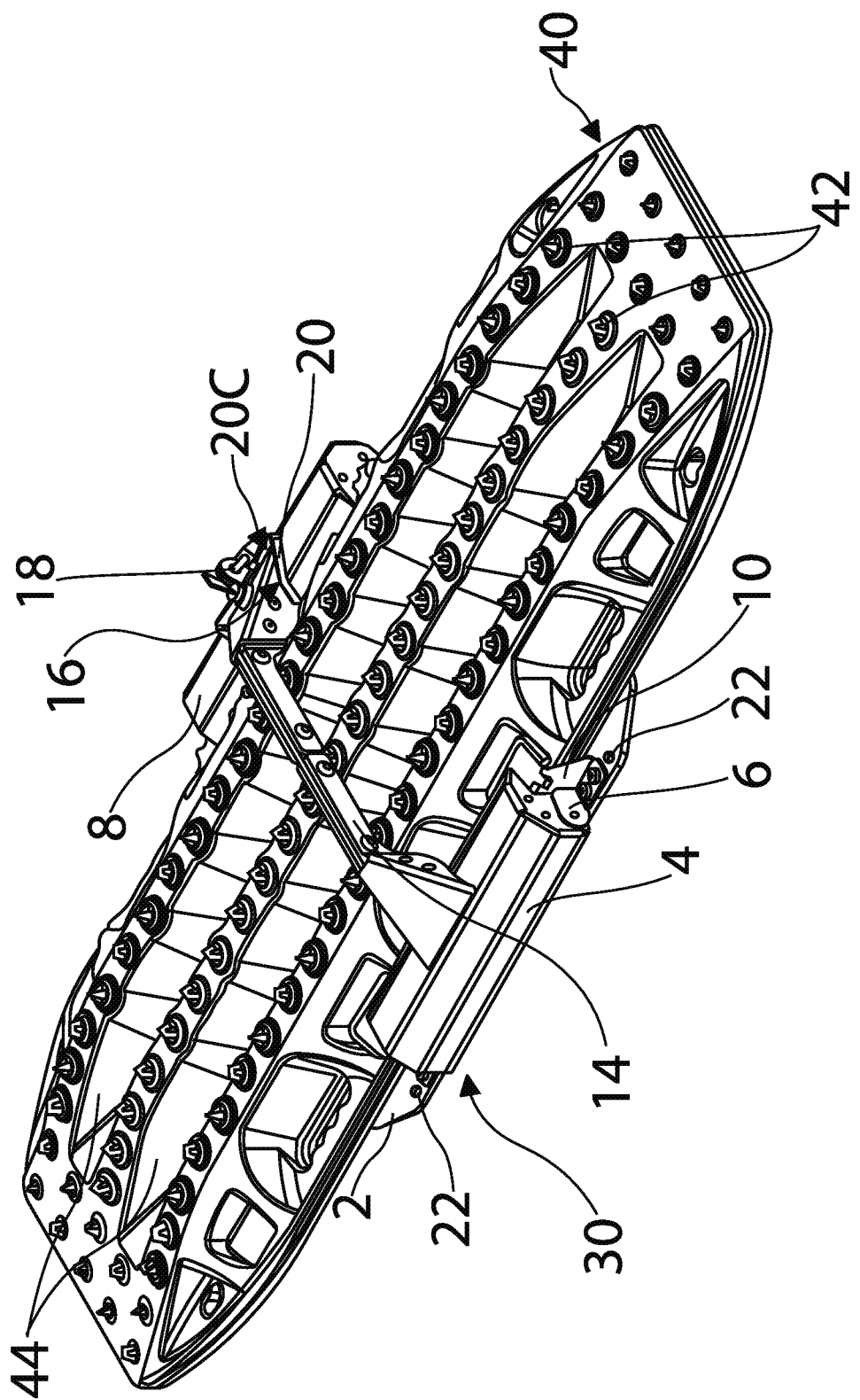
FIG. 4 is an elevated perspective view of the carrier with the recovery board in a retained position and the activating retainment arm in a locked position.
Figure 5:
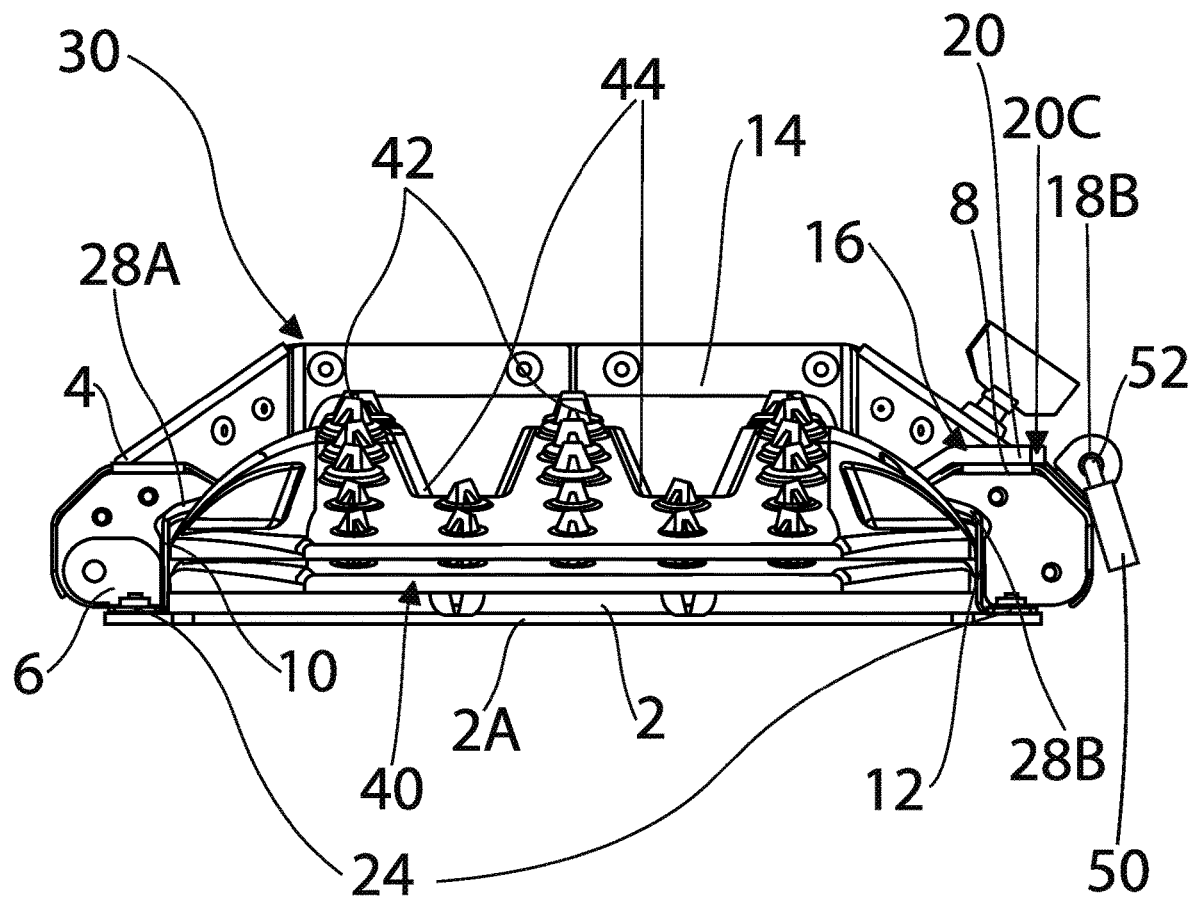
FIG. 5 is a front view of the carrier with the recovery board in a retained position and the activating retainment arm in a locked position.
Figure 6:
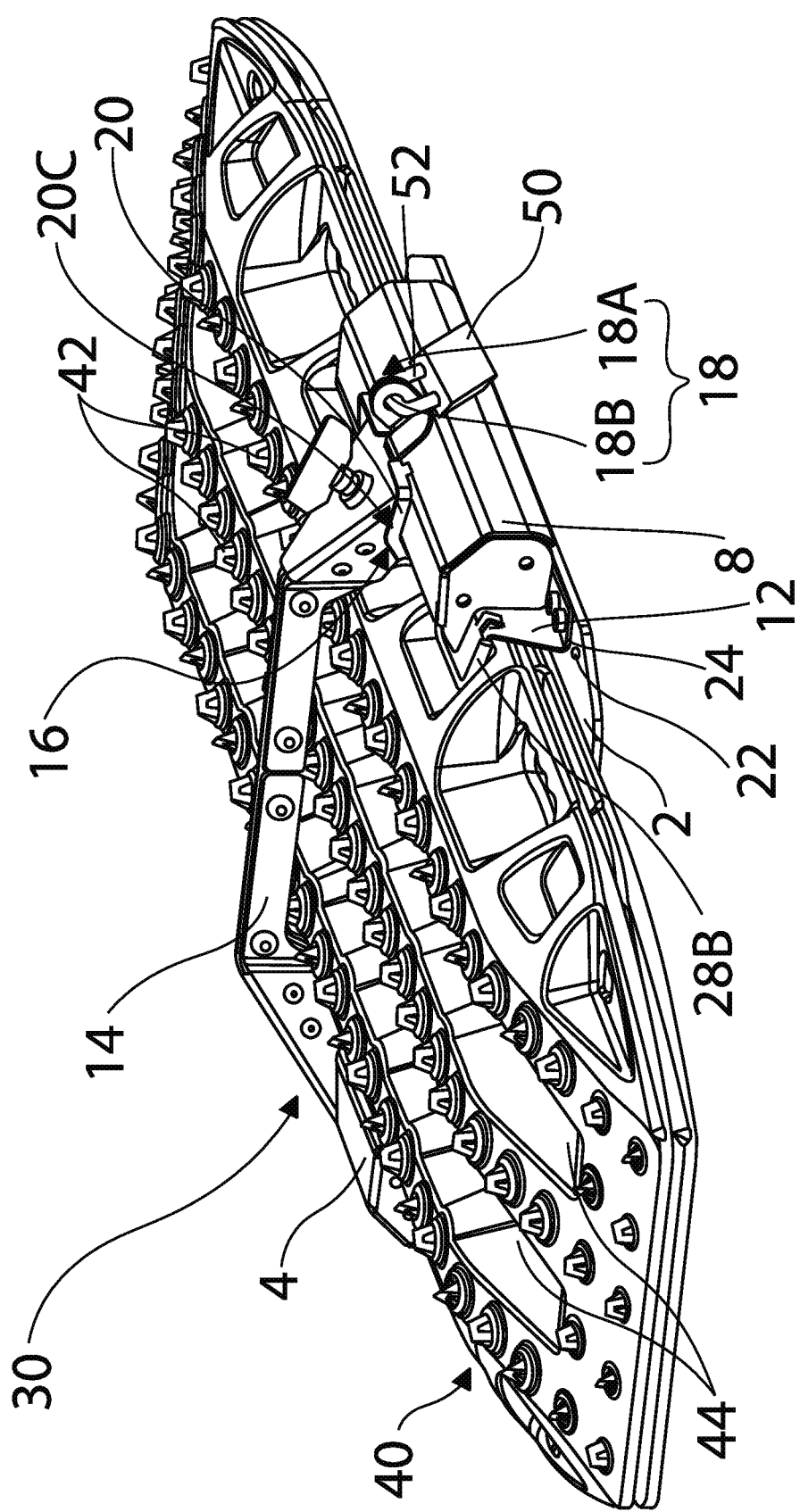
FIG. 6 is a side perspective view of the carrier with the recovery board in a retained position and the activating retainment arm in a locked position.

Now referring to FIGS. 2 and 3, activating retainment arm 14 is pivoted upwardly to lift the hinge mount to pivot above base plate 2 and recovery board 40 positioned under raised pivot mount member 4 in order to mount recovery board 40 into carrier 30. Activating retainment arm 14 is then pivoted downwardly to engage fastener end 16 with receiving latch member 20 on stationary mount member 8. Mounted recovery board 40 is thus securely retained upon carrier 30 when activating retainment arm 14 is in coupled engagement or locked position.

The illustrated embodiment also includes a pair of padlock mount holes 18 that are respectively spaced proximal to the fastener end 16 and receiving latch member 20 such that receiving through hole 18A and through hole 18B are aligned when activating retainment arm 14 is secured in a compression lock for receiving a padlock shackle 52 of padlock 50 in order to further secure the recovery traction board 40 in a tightened engaged position.

Figure 7:
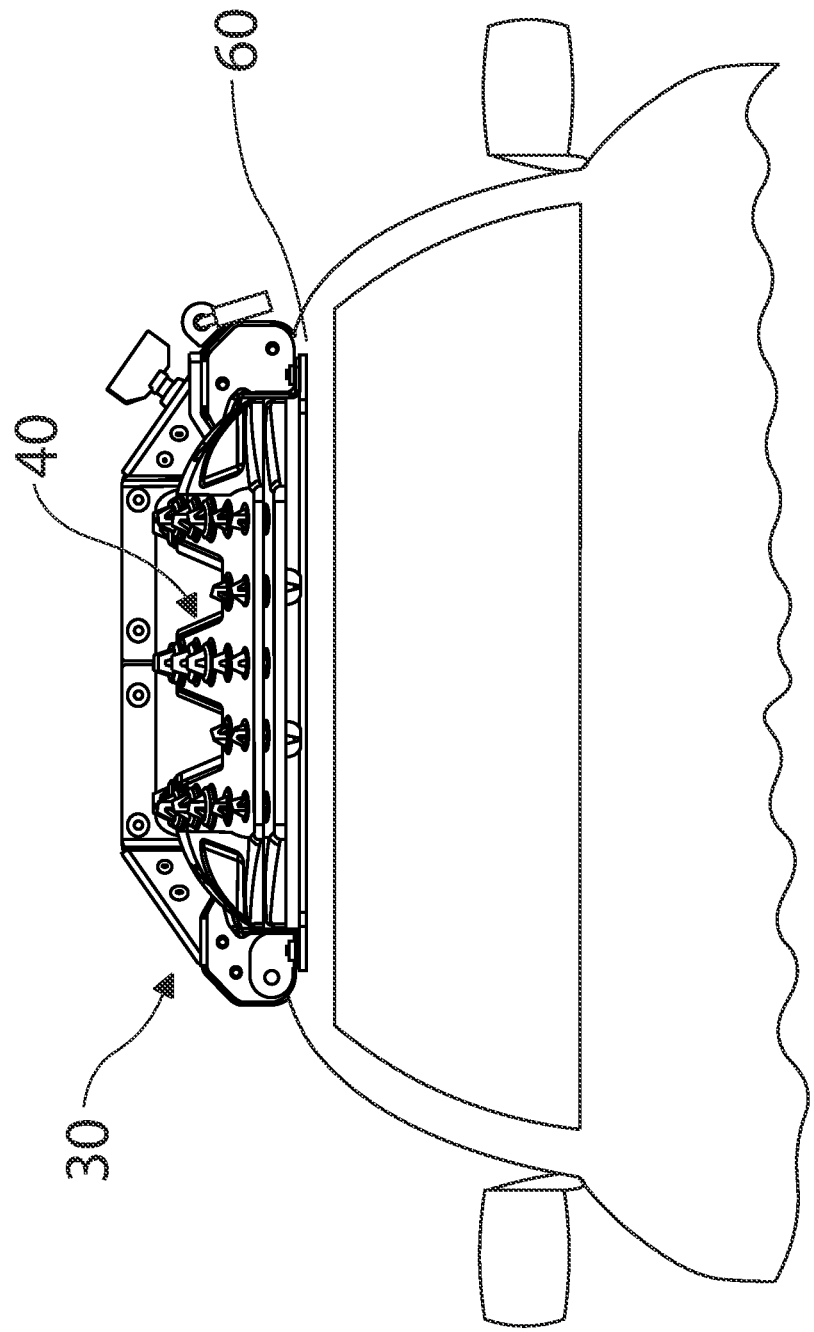
FIG. 7 illustrates the carrier attached to a vehicle surface.

Now referring to FIG. 7, the carrier 30 is shown attached to a vehicle surface 60. While the carrier 30 is attached to the top portion of vehicle in the illustrated embodiment, carrier 30 may be attached to any appropriate surface on or attached to a vehicle or other storage container. As used herein, "vehicle surface" may include any vehicles, SUVs, trucks, trailers, cars, snowmobile or snowcat and any other vehicle as well as accessories, accessory extension or transport container of suitable size and purpose that can be connected to a vehicle and may include, without limitation, rails, bars, surfaces of the bottom or sidewall forming a bed for a truck or hybrid car/truck vehicle.

The scope of the present invention is not delimited to the descriptions and claims herein. Rather, it is contemplated that the functionalities and structural mechanisms within the scope and spirit of the described and claimed mount and retaining system are adaptable to and employed in numerous variations and applications.

In alternative embodiments, the measurements can be varied in accordance with the size and shape of the corresponding recovery board or other vehicle accessory, or, in alternative embodiments, equipment, cargo or carrier.

Base plate 2 and vehicle recovery board 40 may be constructed of a wide variety of commercially available materials that are suitably durable, high tensile strength, resilient, and waterproof. Suitable materials may include, for example and without limitation, polypropylenes such as thermoplastic polyurethane (TPU) or other suitable polymeric. In some embodiments, a nylon or other polymer having a thermoplastic elastomer (TPE) or polyurethane (PU) coating to enhance desired properties and durability may be incorporated in the composition. Carbon fiber derivatives or metal alloys may also be included in the present invention composition. It is understood that the aforementioned materials are exemplary illustrations of appropriate materials for fabrication of the base plate and that other materials providing desired features may be used to construct these and other components of the present invention.

A base plate in some embodiments of the present invention may further include a drain hole, notches, pockets or protrusions for receiving and securing fasteners and/or bolt holes for attachment of a base plate to a surface, tube or rail on a vehicle or trailer. Alternatively, the base plate may be permanently secured to the surface, tube or rail by, for example, welding it thereon.

The mount and retaining carrier of the present invention may be readily assembled and installed on a variety of vehicle surfaces by various known mechanisms. For example, the base plate may be bolted through one or more mount holes and tightened to corresponding hole(s) in the vehicle surface.

The hardware including the mounting, activating retainment arm, clamping, latch and compression lock member components may be composed of any rigid commercially available metal or polymeric, or carbon fiber material in dimensions and density providing sufficient structural durability and strength and mechanical functionality to sustain operability over the product life.

Other commercially available fastener mechanisms, such as, for example, flanges, clips or other straps may also be used to secure the base plate to a vehicle surface. Such mechanisms may be employed in unison or combined in order to accommodate a particular vehicle, mounting surface, or cargo type. It is further contemplated that adjustment of fasteners and supports along the angular orientation of arm members facilitate versatile adaptation accommodation to differing types, sizes and shapes of cargo.

Another aspect of the present invention is provided by alternative embodiments providing various types of fasteners adaptable to differing recreational equipment, tools and other cargo. Fasteners and supports may be pinned, looped, clamped or otherwise secured on the vehicle accessory retainer according to the present invention in order to accommodate differing sizes and shapes of the recreational equipment, tools and cargo cases.

It can thus be readily seen that features and embodiments of the present invention are numerous and diverse, and thus not limited by, but extend beyond, the detailed description and claims herein.

The invention claimed is:

1. A carrier for releasable retaining of a vehicle recovery board, comprising:
   a base plate proportioned to provide a support layer extending between a pair of opposed side edges for fitted correspondence with the recovery board;
   a pivot mount member affixed proximate to one of the pair of opposed side edges of the base plate, wherein the pivot mount member has an active hinge pivotable along an axial trajectory, and wherein the pivot mount member has a pivot leg with a planar bottom downwardly disposed from one of the opposed ends and the planar bottom is attached to a portion of the base plate proximally to the one of the opposed side edges, and wherein the stationary mount member has a stationary crossbar with a fixed leg having a planar bottom downwardly disposed from one of the other of the opposed ends and the planar bottom is attached to a portion of the base plate proximally to the another of the opposed side edges such that the pivot mount member and the stationary mount member appear to be in parallel alignment;
   a stationary mount member is affixed so as to appear in longitudinal parallel alignment proximate to another the pair of opposed side edges in a stationary position, wherein the stationary mount member is configured for receiving an edge portion of the vehicle recovery board, and wherein the stationary mount member has a receiving latch member;
   an activating retainment arm connected to the pivot mount member, wherein the retainment arm is configured for fitted correspondence to an upper surface of the vehicle recovery board, and wherein the retainment arm has a fastener end such that coupled engagement of the fastener end with the receiving latch member secures the vehicle recovery board in a retained position upon the carrier; and
   a pivot flanged stay disposed on an inward facing surface of the pivot mount member and a fixed flanged stay disposed on an inward facing surface of the fixed leg, wherein the pivot flanged stay and the fixed flanged stay are configured to seat corresponding side portions of the recovery board when secured in a retained position.

2. The carrier of claim 1, wherein the coupled engagement of the fastener end with the receiving latch member is activated and deactivated by a compression triggered locking mechanism.

3. The carrier of claim 1, further comprising one or more fastening holes disposed in the base plate, wherein the fastening holes are configured for receiving a fastener affixing the base plate to a surface on or attached to a vehicle.

4. The carrier of claim 1, wherein the pivot mount member has a pivot leg with a planar bottom downwardly disposed from one of the opposed ends and the planar bottom is attached to a portion of the base plate proximally to the one of the opposed side edges, and wherein the stationary mount member has a stationary crossbar with a fixed leg having a planar bottom downwardly disposed from one of the other of the opposed ends and the planar bottom is attached to a portion of the base plate proximally to the another of the opposed side edges such that the pivot mount member and the stationary mount member appear to be in parallel alignment.

5. The carrier of claim 1, further comprising:
a first pad portion configured for fitted correspondence with the planar bottom of the pivot leg, wherein the first pad portion is juxtapositioned between a corresponding portion of the base plate and the planar bottom of the pivot leg; and
a second pad portion configured for fitted correspondence with the planar bottom of the fixed leg, wherein the second pad portion is juxtapositioned between a corresponding portion of the base plate and the planar bottom of the fixed leg.

6. The carrier of claim 1, wherein the vehicle recovery board has protrusions extending from at least a portion of the upper surface and the retainment arm is configured for grasping the vehicle recovery board between the protrusions when the retainment arm is coupled in locked engagement.

7. The carrier of claim 1, wherein the activating retainment arm has a first through hole proximate to the fastener end and the receiving portion of the stationary mount member has a corresponding second through hole proximate to the receiving latch member configured for aligned correspondence whereby a padlock shackle can be received through the aligned first through hole and second through hole and the padlock latched when the fastener end and the receiving latch member are coupled in locked engagement to further secure the recovery traction board in a retained position.

8. A carrier for releasable retaining of a vehicle recovery board, comprising:
a parallelogram-shaped base plate having an upper and a bottom surface disposed between a pair of opposed side edges, wherein the base plate is configured for receiving the vehicle recovery board;
a pivot mount member including a hinged mount with at least one pivot leg with a downwardly disposed bottom planar surface affixed to the base plate proximate to one of the pair of opposed side edges;
an activating retainment arm connected to the pivot mount member, wherein the retainment arm is configured for fitted correspondence to an upper surface portion of the vehicle recovery board, and wherein the retainment arm has a fastener end; and
a stationary mount member having at least one fixed leg affixed proximate to another of the pair of opposed side edges and wherein a receiving latch is disposed on an outer surface of the stationary mount member,
wherein the pivot mount member and the stationary mount member are dimensioned and spaced to receive the corresponding side edges of the vehicle recovery board such that the coupled engagement of the fastener end with the receiving latch member securely retains the vehicle recovery board upon the carrier; and
wherein the pivot mount member has a pivot crossbar with opposed ends, and wherein the at least one pivot leg includes two pivot legs having planar bottoms, wherein the one pivot leg is downwardly disposed from one of the opposed ends and the planar bottom thereof is attached to a portion of the base plate proximally to the one of the opposed side edges and the another of the two pivot legs is downwardly disposed from the other of the opposed ends and the planar bottom thereof is attached to a portion of the base plate proximally to the one of the opposed side edges in substantial longitudinal alignment with the one of the two pivot legs, and wherein the stationary mount member has a fixed crossbar with opposed ends, and wherein the at least one fixed leg is two fixed legs having planar bottoms and the one fixed leg is downwardly disposed from one of the opposed ends and the planar bottom thereof is attached to a portion of the base plate proximally to the another of the opposed side edges and the another of the two fixed legs is downwardly disposed from the another of the opposed ends and the planar bottom thereof is attached to a portion of the base plate proximally to the another of the opposed side edges appear in longitudinal alignment with the one of the two fixed legs such that the pivot mount member and the stationary mount member appear in parallel alignment.

9. The carrier of claim 8, wherein the coupled engagement of the fastener end with the receiving latch member is activated and deactivated by a compression triggered locking mechanism.

10. The carrier of claim 8, further comprising one or more fastening holes disposed in the base plate, wherein the fastening holes are configured for receiving a fastener affixing the base plate to a surface on or attached to a vehicle.

11. The carrier of claim 8, further comprising:
one or more pivot flanged stays disposed on an inward facing surface of each of the pivot legs; and
one or more fixed flanged stays disposed on an inward facing surface of the fixed legs wherein the fixed flanged stays and the pivot flanged stays are configured to seat corresponding side portions of the recovery board when secured in a retained position.

12. The carrier of claim 11, further comprising:
two first pad portions configured for fitted correspondence with the planar bottoms of the two pivot legs, wherein the two first pad portions are juxtapositioned between a corresponding portion of the base plate and the planar bottom of the pivot legs; and
two second pad portions configured for fitted correspondence with the planar bottoms of the fixed legs, wherein the second pad portions are juxtapositioned between a corresponding portion of the base plate and the planar bottoms of the fixed leg.

13. The carrier of claim 11, further comprising a first through hole proximate to the fastener end of the retainment arm and a corresponding second through hole proximate to the receiving latch member of the stationary mount member, wherein the first through hole and the second through hole are configured for aligned correspondence whereby a padlock shackle can be received through the aligned first through hole and second through hole and latched when the retainment arm is coupled in locked engagement to further secure the recovery board.

14. A carrier for releasable retaining of at least one piece of cargo, comprising:
a base plate configured for fitted correspondence so as to provide a support layer disposed between a pair of opposed side edges;
a pivot mount member including a hinged mount with at least one pivot leg with a downwardly disposed bottom planar surface affixed to the base plate proximate to one of the pair of opposed side edges;

a retainment arm configured for fitted correspondence to an upper surface portion of the cargo, wherein the retainment arm has a hinge end connected to the pivot mount member and wherein the retainment arm has an opposing fastener end; and a stationary mount member having at least one fixed leg affixed proximate to another of the pair of opposed side edges and wherein a receiving latch is disposed on an outer surface of the stationary mount member, wherein the pivot mount member and the stationary mount member are dimensioned and spaced such that coupled engagement of the fastener end with the receiving latch member securely retains the cargo upon the carrier; and wherein the pivot mount member has a pivot crossbar with opposed ends, and wherein the at least one pivot leg includes two pivot legs having planar bottoms, wherein the one pivot leg is downwardly disposed from one of the opposed ends and the planar bottom thereof is attached to a portion of the base plate proximally to the one of the opposed side edges and the another of the two pivot legs is downwardly disposed from the other of the opposed ends and the planar bottom thereof is attached to a portion of the base plate proximally to the one of the opposed side edges in substantial longitudinal alignment with the one of the two pivot legs, and wherein the stationary mount member has a fixed crossbar with opposed ends, and wherein the at least one fixed leg is two fixed legs having planar bottoms and the one fixed leg is downwardly disposed from one of the opposed ends and the planar bottom thereof is attached to a portion of the base plate proximally to the another of the opposed side edges and the another of the two fixed legs is downwardly disposed from the another of the opposed ends and the planar bottom thereof is attached to a portion of the base plate proximally to the another of the opposed side edges appear in longitudinal alignment with the one of the two fixed legs such that the pivot mount member and the stationary mount member appear in parallel alignment.

15. The carrier of claim 14, wherein the coupled engagement of the fastener end with the receiving latch member is activated and deactivated by a compression triggered locking mechanism.

16. The carrier of claim 14, further comprising one or more fastening holes disposed in the base plate, wherein the fastening holes are configured for receiving a fastener affixing the base plate to a surface on or attached to a vehicle.

17. The carrier of claim 14, further comprising:
one or more pivot flanged stays disposed on an inward facing surface of the pivot legs;
one or more fixed flanged stays disposed on an inward facing surface of the fixed legs,
wherein the fixed flanged stays and the pivot flanged stays are configured to seat corresponding side portions of the cargo when secured in a retained position;
a first through hole proximate to the fastener end of the retainment arm; and
a corresponding second through hole proximate to the receiving latch member of the stationary mount member,
wherein the first through hole and the second through hole are configured for aligned correspondence whereby a padlock shackle can be received through the aligned first through hole and second through hole and latched when the retainment arm is coupled in locked engagement to further secure the cargo.

\* \* \* \* \*